United States Patent [19]

Greenway et al.

[11] Patent Number: 5,759,003
[45] Date of Patent: Jun. 2, 1998

[54] COMBINED SCREW AND CLEARANCE DRILL

[76] Inventors: John Michael Greenway; Matthew James Greenway, both of 44 Spruce Dr., Westwood, Mass. 02090

[21] Appl. No.: 681,291

[22] Filed: Jul. 22, 1996

[51] Int. Cl.$^6$ ............................................. F16B 35/04
[52] U.S. Cl. .......................... 411/421; 411/417; 411/411; 411/399
[58] Field of Search .................... 411/383, 386, 411/387, 411, 417, 418, 420, 421, 399

[56] References Cited

U.S. PATENT DOCUMENTS

| | | | |
|---|---|---|---|
| 142,112 | 8/1873 | Ladd et al. | 411/421 |
| 429,851 | 6/1890 | Ericson | 411/418 |
| 453,563 | 6/1891 | Nicholson | 411/418 |
| 1,288,893 | 12/1918 | Holmes | 411/421 |
| 1,294,268 | 2/1919 | Holmes | 411/421 |
| 1,465,148 | 8/1923 | Rosenberg | 411/418 |
| 1,909,477 | 5/1933 | Trotter | 411/420 |
| 1,933,332 | 10/1933 | May | 411/418 |
| 2,393,990 | 2/1946 | Kamborian | 411/421 |
| 3,578,762 | 5/1971 | Siebol | |
| 3,682,038 | 8/1972 | Lejdegard | |
| 3,903,784 | 9/1975 | Dekker | 411/399 |
| 4,516,893 | 5/1985 | Barth | 411/399 |
| 4,645,396 | 2/1987 | McCauley et al. | |
| 4,673,323 | 6/1987 | Russo | 411/418 |
| 4,697,969 | 10/1987 | Sparkes | 411/387 |
| 5,199,839 | 4/1993 | DeHaitre | 411/399 |
| 5,275,601 | 1/1994 | Gogolewski et al. | 411/399 |
| 5,295,774 | 3/1994 | Roberts | |
| 5,382,195 | 1/1995 | Hiler | |
| 5,482,418 | 1/1996 | Giannuzzi | 411/399 |
| 5,499,892 | 3/1996 | Reed | 411/399 |
| 5,518,352 | 5/1996 | Lieggi | 411/399 |

*Primary Examiner*—Steven N. Meyers
*Assistant Examiner*—Tuyet-Phuong Pham
*Attorney, Agent, or Firm*—Ostrager, Chong & Flaherty

[57] ABSTRACT

A combination screw and clearance drill is provided that in one mode of operation is able to drill a pilot hole for the screw threads through a top piece of material and then screw into a lower piece of material, thus enabling the two pieces of material to be screwed tightly together in a single operation. The screw is designed in such a manner that the ability of the screw to drill a clearance hole for the threads does not substantially effect the gripping ability of the screw. In one direction of rotation the screw is able to drill the clearance hole for the threads of the screw and by reversing rotation the screw is able to stop drilling a clearance hole and function as a regular screw. Flutes in the screw head cut a counter bore for the head when the head contacts the surface of the top piece of material.

33 Claims, 12 Drawing Sheets

FIG. 12

COMBINED SCREW AND CLEARANCE DRILL

FIELD OF THE INVENTION

This invention generally relates to screws having industrial, workshop, hobby and household applications. Screws produced by the method of the invention have drill tips and/or flutes with cutting angles that facilitate the drilling of a clearance hole in one direction of rotation and enabling the screw to act as a conventional screw in the opposite direction of rotation.

BACKGROUND OF THE INVENTION

Screws are conventionally manufactured with threads that enable the screw to screw into a material and gain a purchase. One of the benefits of this action is that it enables two pieces of material, such as wood, to be screwed together. Several different types of screws are available.

Prior art screws incorporating threads and a drill are used mainly in the sheet metal industry. A method of making a screw of this type is represented by U.S. Pat. No. 5,382,195 to Allen J. Hiler and screws of this type are described in U.S. Pat No. 3,682,038 to Sixten H. Lejdegard and U.S. Pat. No. 5,295,774 to David Roberts. The art configures the drill and screw combination so that the drill on the tip of the screw is able to drill a pilot hole for the screw threads.

The art describes drill/screw combinations where the drilling action is in the same direction as the screwing action. Screws of this type are typically used to secure a section of sheet metal such as duct work. The diameter of the pilot drill on the tip of the screw is approximately the same as the root diameter of the threads. The screw is rotated in the direction enabling the drill to drill a pilot hole in the sheet metal. When the threads contact the sheet metal the drilling action ceases and the screw screws into the hole formed by the screw's drill section.

Attempts to use a drill/screw combination where the drill tip is the same diameter as the screw threads result in the drill removing material required for the screw threads to gain a purchase, thus making it impossible for the screw to drill a clearance hole. This is particularly apparent in the case of wood where any attempts to use a drill/screw combination to form a clearance hole in a top piece of wood result in the drill portion continuing to drill in the lower piece of wood hence eliminating all opportunity for the threads to gain a purchase in the lower piece of material.

U.S. Pat. No. 4,645,396 to Jon R. McCauley et al. describes a screw with a drill tip larger then the diameter of the threads said extension defining a relatively narrow dimension with respect to a circumference of said screw so as to be frangibly removable from said drilling tip in response to a predetermined force applied thereto. In this case, additional torque is applied using materials of differing hardness. When the drill tip contacts the hardened material, the tip breaks and the drilling action ceases. The use of this technique is very limited and cannot be used in circumstances where materials such as wood are being joined together.

From the foregoing, it will be appreciated that prior art techniques using drill/screw combinations cannot be applied to joining together materials, such as wood, where a pilot hole is required in the top piece of material in order to bring the two pieces of material into close contact.

Conventional methods of screwing two pieces of wood together involve at least six separate operations: (1) the position of the screw is marked on the top piece of wood; (2) the top piece of wood is then moved away from the lower piece of wood so that the lower piece of wood is not damaged by the clearance hole; (3) a drill bit is placed in a drill and used to drill a clearance hole for the screw in the top piece of wood; (4) the drill bit is then removed from the drill and replaced with a countersink drill, which is used to drill a counter bore for the screw head; (5) the top piece of wood is then repositioned over the lower piece of wood and a screw is placed in the clearance hole; and (6) a screwdriver or screw gun is then used to turn the screw.

The screwing action of the screw into the lower piece of wood causes the two pieces of wood to be pulled into close contact. The clearance hole is essential to enable the two pieces of wood to be pulled into close contact by the action of the screw screwing into the second piece of wood. The counter bore is required to enable the screw head to sit flush with the surface of the top piece of wood.

The consequences of not drilling a clearance hole and a counter bore for the screw head in the top piece of material are as follows. The screw first forms threads in the top piece of wood and then contacts the lower piece of wood. The screw continues to screw through the top piece of wood before gaining a purchase in the second piece of wood. This causes the pieces of wood to push apart and a gap to form between them. The screw then screws into the lower piece of wood. Threads now exist in both pieces of wood and a gap exists between the inner surfaces.

It is virtually impossible to bring these two pieces of wood into the desired close contact. To close the gap between the pieces of wood, the threads on the top piece of wood must be stripped. Attempting to achieve this with a screw gun with sufficient torque to strip the threads in the wood will often result in the screw shearing or the drive slot in the screw head being ruined before the threads are stripped and the pieces of wood are brought into close contact. Ruining the screw head will also prevent removal of the screw. The exception to this is where the top piece of wood is thin or the top of material is soft.

It is therefore a broad object of the invention to provide a screw capable of drilling a clearance hole in one mode of operation followed by the ability to act as a screw in a second mode of operation.

A more specific object of the invention is to reduce the number of process steps required to join two pieces of material together.

A still further object of the invention to provide flutes in the screw head capable of cutting a counter bore for the head when the head contacts the top piece of material.

DISCLOSURE OF THE INVENTION

In the present invention, these purposes as well as others which will be apparent are achieved generally by providing a combination screw and clearance drill (hereinafter "drill/screw") which is capable of both drilling a clearance or pilot hole for the screw's threads and functioning as a screw, thus enabling two or more pieces of material to be joined together in close contact in a single operation.

To achieve this, the drill/screw drills a clearance hole in a top piece of material until it reaches a second or lower piece of material, where it ceases drilling and acts as a conventional screw, thus enabling the screw threads to screw into the lower piece of material and to bring the two pieces into close contact. There are conflicting requirements to meet this objective. It would seem impossible to form a drill point on the end of a screw with flutes extending into the screw which would stop drilling a clearance hole for the threads when necessary and allow the screw threads to grip into the material when required.

Conventional drill/screw combinations having a drill point and flutes only on the end of the screw would provide a clearance hole in the first piece of material and continue to drill a hole larger than the diameter of the threads in the second piece of material, thus ruining the grip of the screw threads in the second piece of material.

In a preferred embodiment of this invention, the drill/screw achieves the conflicting requirements of drilling a clearance hole in a top piece of material and acting as a screw in a lower piece of material by utilizing a drill tip with flutes and cutting angles cut into the screw in the opposite direction to the screw threads. This enables the screw to act as a clearance drill when rotated in one direction and act as a screw when rotated in the opposite direction.

To achieve the objective of screwing two pieces of material together, the drill/screw is simply placed in a screw gun or similar device and placed in the desired location on the top piece of material. The screw gun is placed in reverse and the drill/screw is rotated in the reverse direction to the screwing action. This enables the drill/screw to drill a clearance hole in the top piece of material. The screw gun is then placed in forward so that the drilling action ceases and the drill/screw can act as a conventional screw. The screw can then be screwed into the second piece of material. The drill flutes extending into the screw threads are not sufficient enough to significantly reduce the screwing or gripping action of the screw's threads. The two pieces of material are pulled into close contact in a single operation. Lateral or helically wound slots or grooves in the bottom side of the drill/screw's head cut the counter bore for the screw head when the head contacts the top piece of material.

BEST MODE OF CARRYING OUT THE INVENTION

Figure 1A:
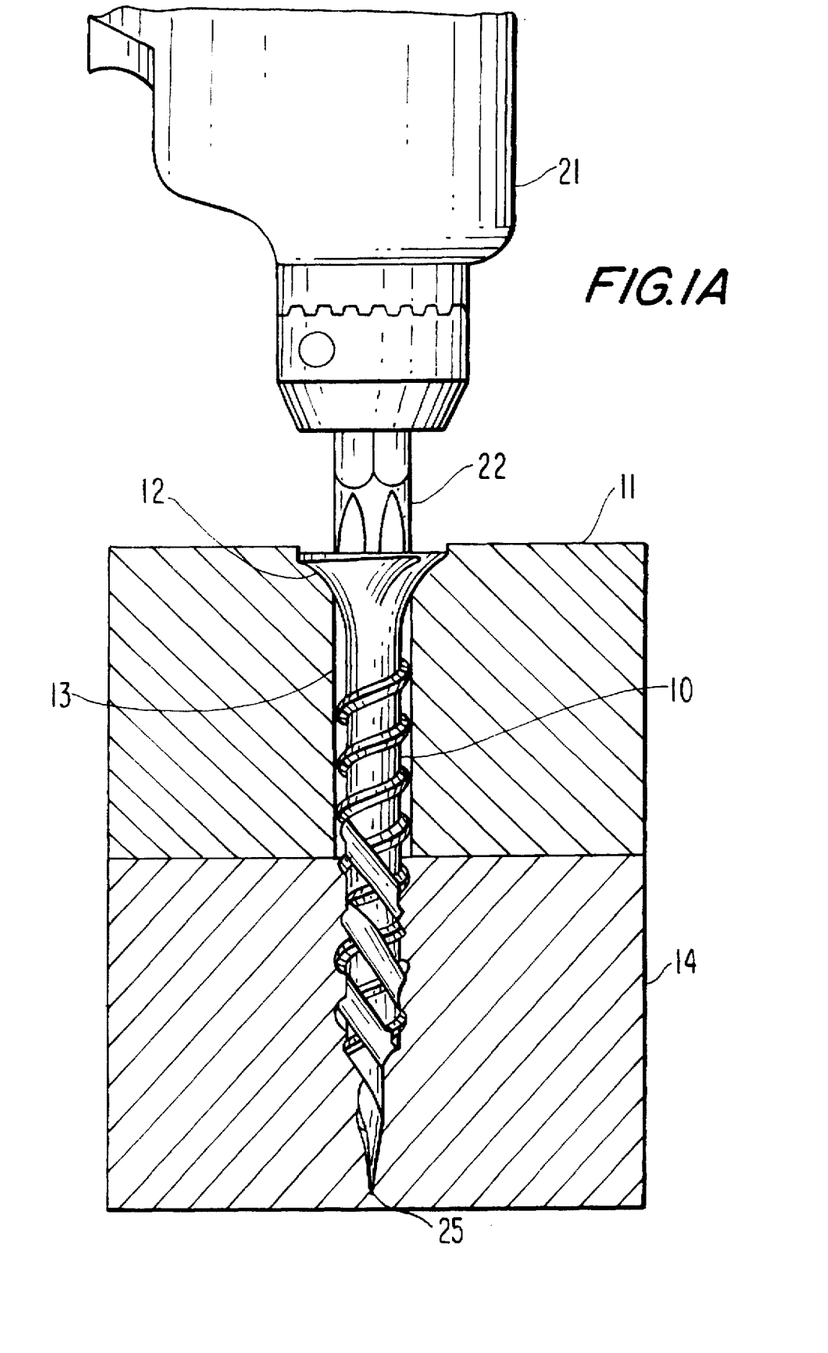
FIG. 1A is an elevational view of a drill/screw in accordance with a first preferred embodiment of the present invention after drilling a pilot hole in a first workpiece and screwing into a second workpiece in accordance with the process of the invention.
Figure 1B:
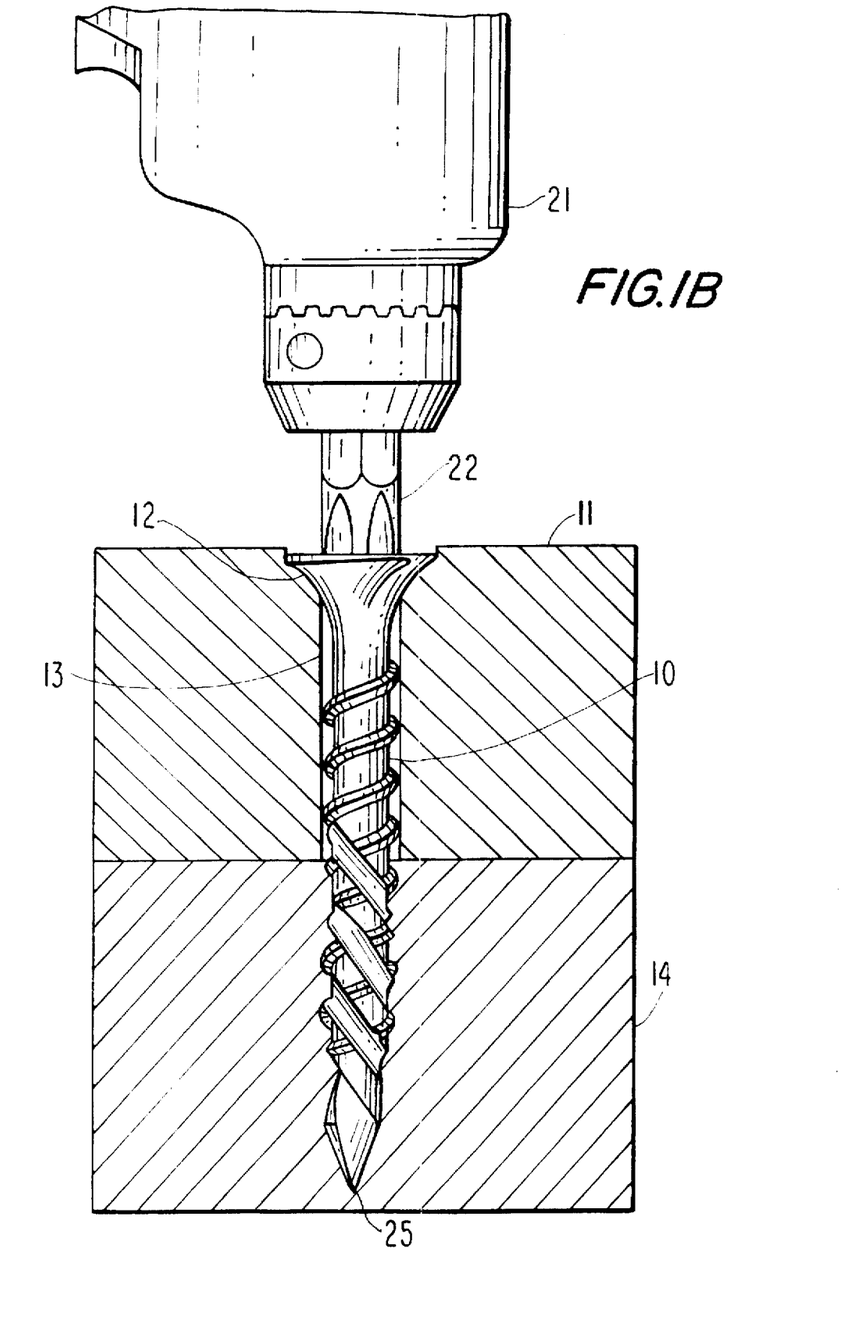
FIG. 1B is an elevational view of a drill/screw in accordance with a second preferred embodiment of the present invention after drilling a pilot hole in a first workpiece and screwing into a second workpiece in accordance with the process of the invention.

With reference to the drawings, FIGS. 1A and 1B illustrate drill/screw 10 in accordance with the invention fastening together two pieces of material. The top piece of material 11, has a counter bore 12, and a clearance hole 13, which enables the screw 10, to pass freely through the top piece of material 11, and screw into the lower piece of material 14.

For purposes of this description, the invention drill/screw 10 and its process for use will be described with respect to two pieces of wood. However, it should be understood that the invention screw and process for use may be applied to any appropriate workpiece materials which can be joined together by a screw, such as wood, plastics, laminates, composites and metals, and to any number of workpieces. The invention drill/screw has particular application to materials which require a clearance hole in a top piece to bring it in close contact with a bottom or lower piece. Further, any suitable device may be used to drive the screw through both pieces of material including, but not limited to, a screwdriver or screw gun.

Figure 2A:
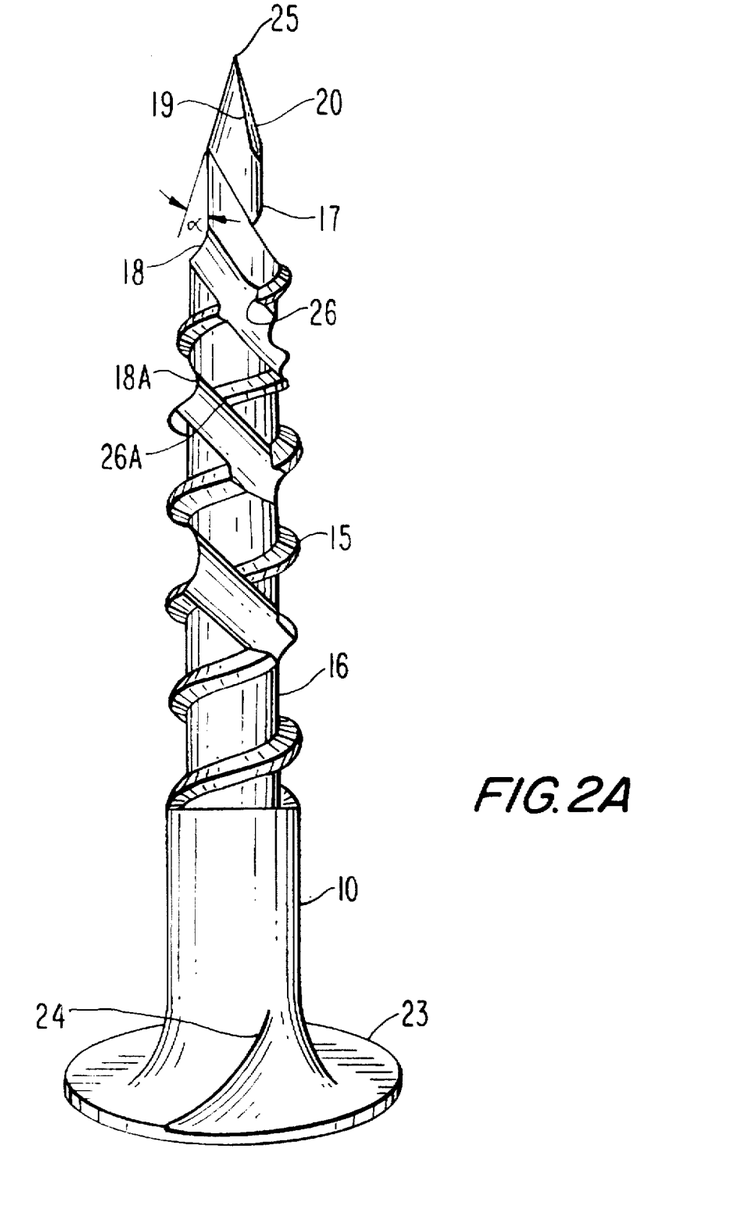
FIG. 2A is an elevational view of the drill/screw shown in FIG. 1A.
Figure 2B:
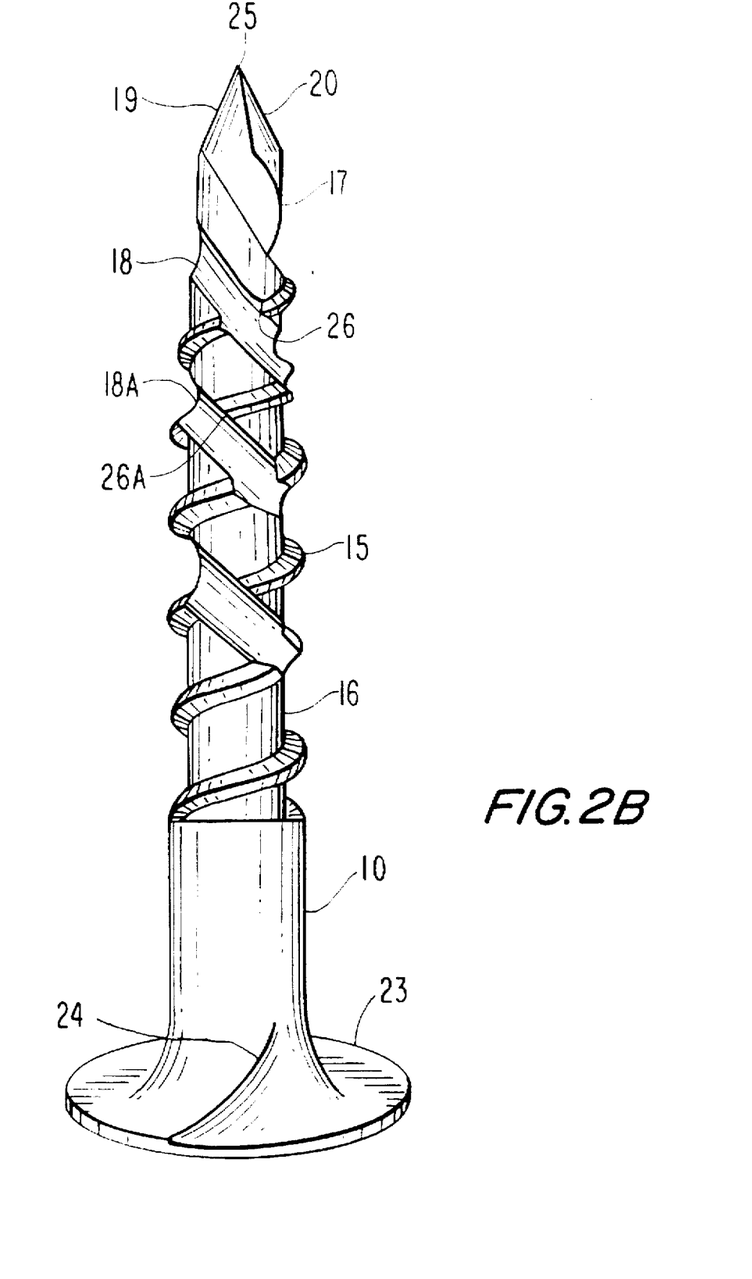
FIG. 2B is an elevational view of the drill/screw shown in FIG. 1B.

FIGS. 2A and 2B illustrate a preferred embodiment of the drill/screw 10. The drill/screw 10 has a single screw thread 15 extending around the periphery of the drill/screw's shaft 16 in a helical pattern. Although drill/screws having multiple (or multi-start) threads are within the scope of this invention. The drill/screw 10 is equipped with a drill bit 17 and two sets of flutes 18 and 18A extending from the drill tip 20 along the length of the drill/screw cutting into and across the screw thread 15. The screw thread 15 rotates in a helical path in one direction and the flutes 18, 18A rotate in a helical path in the opposite direction. The cutting end 19 of the drill tip 20 is arranged so that the cutting action occurs when the drill is rotated in the reverse direction to the screwing action of the drill/screw. The angle of the drill tip 20 is at a steeper angle than the angle of a conventional drill tip. A preferred drill tip angle ($\alpha$) is approximately 30°.

Referring again to FIG. 1, the screw point 25 of the drill/screw 10 is placed in contact with the surface of a top piece of wood 11. A drill or screw gun 21 and screw bit 22 are used to rotate the drill/screw 10 in the opposite direction to the screwing action of the drill/screw 10. This enables the drill bit 17 and the flutes 18, 18A to drill a clearance hole 13 through the top piece of wood 11. When the drill tip 17 contacts the top surfaces of the lower piece of wood 14, the rotation of the drill or screw gun 21 is reversed, enabling the drill/screw 10 to cease drilling. Reversing the rotation enables the drill point 25 to dig into the second piece of wood 14 in the same manner as the tip of a conventional screw. When the drill/screw is in the screwing mode, the steep angle ($\alpha$) of the drill tip 20 enables the drill/screw 10 to penetrate easily into the lower piece of wood 14, pushing wood aside and enabling the screw threads 15 to bite into the second piece of wood 14 and screw the screw 10 into the lower piece of wood 14.

The screw head 23 may be equipped with grooves 24 disposed on the head's lower surface which cut when the drill/screw 10 is rotated in the screwing direction. The grooves 24 assist in cutting a counter bore 12 for the screw head 23 when the head contacts the surface of the top piece of wood 11.

If necessary, the top and lower pieces of wood could be separated after drilling the clearance hole in the top piece of wood. The screw head would then be pushed into contact with the top surface of the top piece of wood. This will enable the screw to achieve any number of revolutions that may be necessary for the grooves in the screw to cut the counterbore in hard materials. This technique could be used in situations where the counterbore cannot be cut using the limited number of revolutions available as the screw/drill screws into the lower piece of wood. The grooves in the head could be designed to cut in the forward or reverse directions.

The screw head 23 could be of any shape such as a cap head or button head and need not necessarily be a countersink. Further, the screw head 23 could be any conventional head used for rotation of a screw shaft, including, but not limited to, a slotted screw head, a philips screw head, and the like.

In a preferred embodiment, the helical path of the flutes 18, 18A along the length of the screw enhances the drilling action and enables the cutting edge 26, 26A of the thread 15 where it contacts the flutes 18, 18A to cut into the surface of top piece of wood 11. This ensures that the clearance hole 13 is the same diameter as the screw threads 15.

The drilling action of the screw threads 15 can be further enhanced by screwing the drill/screw 10 down into the top piece of wood 11, reversing the drill, and applying pressure to prevent the drill/screw 10 from screwing out of the top piece of wood 11. This causes both the drill flutes 18 and the screw threads 15 to cut the clearance hole 13, thus reducing the forces required to drill the clearance hole 13. This procedure is followed by reversing the screw gun 21 back to the forward direction, thus enabling the screw threads 15 to screw down into the lower piece of wood 14. The particles of wood dislodged by the drilling action do not all have to be discharged from the clearance hole 13 to enable the drill/screw 10 to rotate freely. Some of the drilled out particles will be packed between the screw threads 15 in the clearance hole 13.

The drill portion 24 of the screw head 23 and the cutting edge of the thread 26, 26A can only cut into the wood when rotated in the opposite direction to the screwing action. After drilling through the first piece of wood 11, the rotation of the screw ceases and the direction of rotation is then reversed, enabling the drill to screw into the second piece of wood 14.

Figure 3:
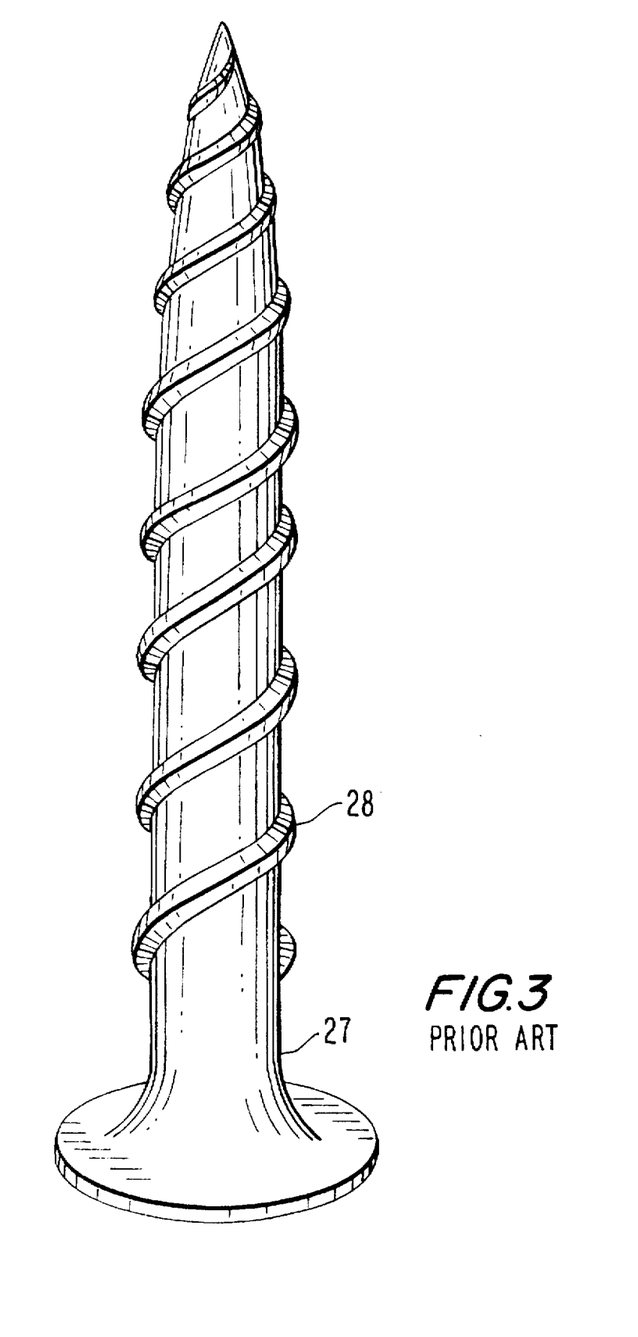
FIG. 3 is an elevational view of a prior art screw.
Figure 4:
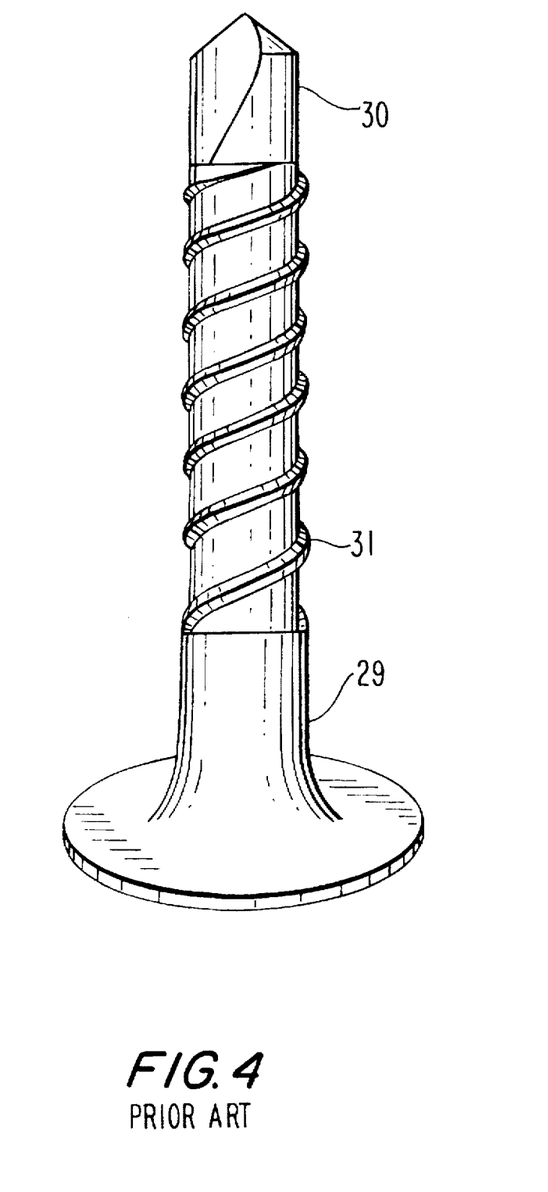
FIG. 4 is an elevational view of a prior art sheet metal screw.

For comparison, FIG. 3 shows a prior art screw 27 having screw threads 28 extending along the length of the screw. This type of screw is used for screwing into materials such as wood. FIG. 4 shows a prior art screw 29, equipped with a drill tip 30, and screw threads 31. This type of screw is commonly used in the sheet metal industry. The tip drills a tapping hole through thin sheets of metal when the screw is rotated in the same direction as the screwing action. The screw then screws into both sheets of metal material. The tapping hole is always of a smaller diameter then the threads which causes threads to be formed in both sheets of metal.

Figure 5:
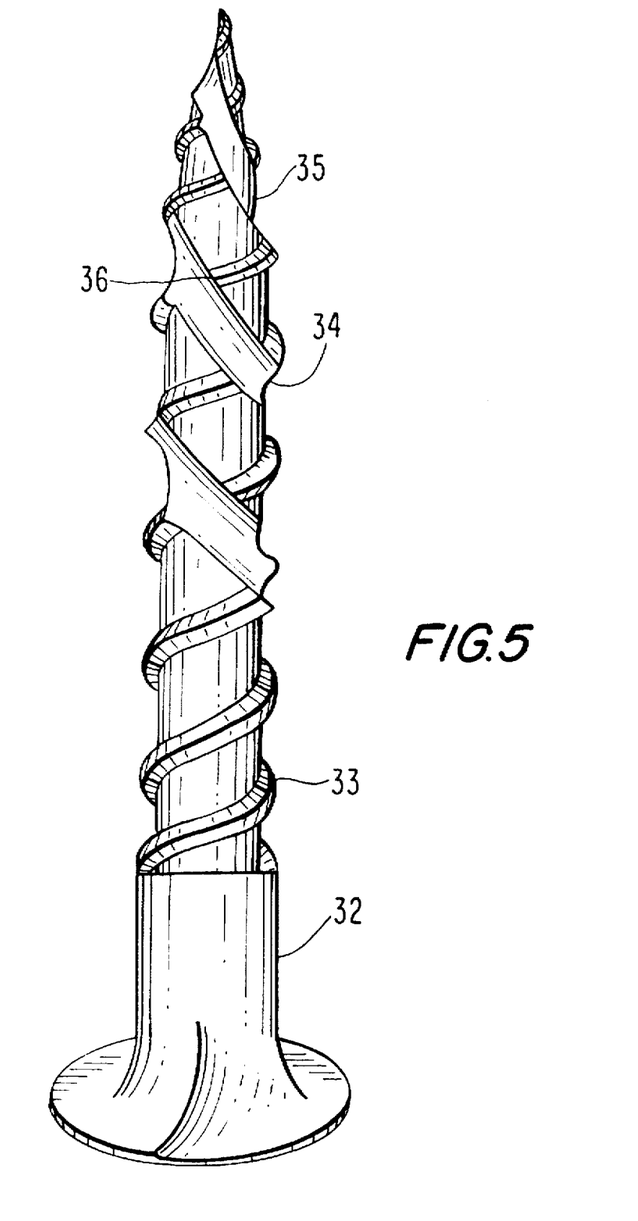
FIG. 5 is an elevational view of a drill/screw in accordance with a third embodiment of the present invention.

Several different embodiments of the drill/screw in accordance with the invention are possible. FIG. 5 shows a second embodiment of drill/screw. The drill/screw 32 has screw threads 33 extending along the length of the screw and two helical flutes 34 and 35 extending along the length of the screw from the tip. The angle of the drill flutes 34, 35 is in the opposite direction to the screw threads 33. The helical flutes 34, 35 enable the edge 36 of the thread 33 to have a cutting action when the screw is rotated in the reverse direction. This type of screw does not require a drill tip. The cutting action of the leading edge 36 of the thread 33 removes the required material to provide a clearance hole. Wood particles removed to establish the clearance hole are either ejected from the clearance hole or are packed into the helical flutes 34, 35 eliminating the need to entirely clear the particles from the clearance hole.

Figure 6A:
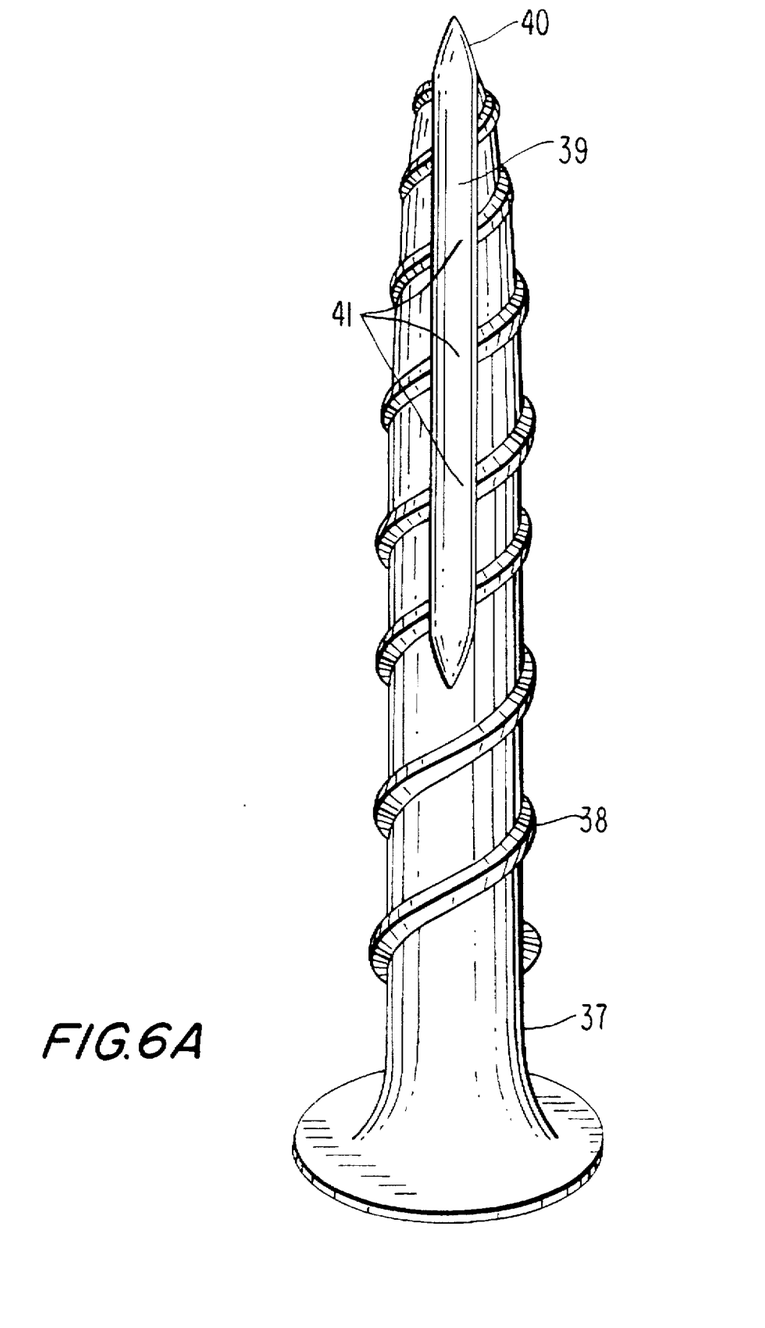
FIG. 6A is an elevational view of a drill/screw in accordance with a fourth embodiment of the present invention.
Figure 6B:
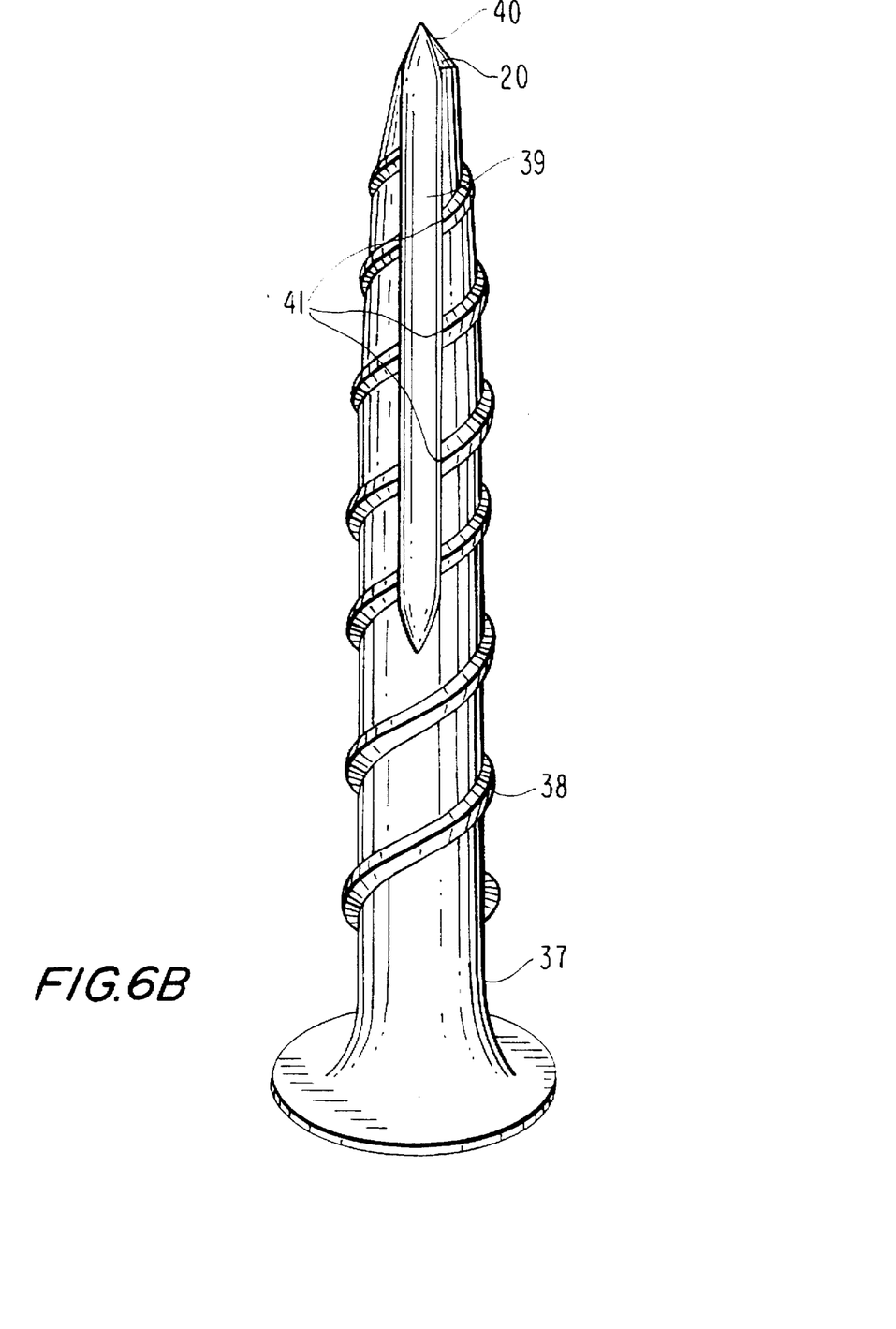
FIG. 6B is an elevational view of a drill/screw in accordance with a fifth embodiment of the present invention.

FIG. 6A shows a third embodiment of the drill/screw. FIG. 6B shows a modification of this embodiment including a drill tip 20 having a diameter equal to the root diameter of screw threads 38. In this embodiment, a screw 37 has helical threads 38 extending along the length of the screw and grooves 39 extending from the tip 40 in an axial direction parallel to the shaft and along the length of the screw. Sharp edges 41 formed in the thread 38 where the thread contacts the groove 39 provide cutting capability when the screw 37 is rotated rapidly in the reverse direction (i.e., opposite the screw direction). Cut particles of material from the clearance hole are packed in the groove 39, eliminating the need to entirely clear the particles from the clearance hole.

Figure 7:
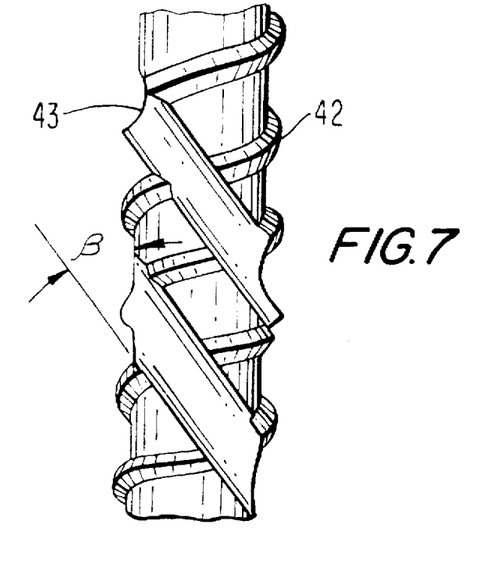
FIG. 7 is an elevational view of a middle portion of the drill/screw of FIG. 1A.
Figure 8:
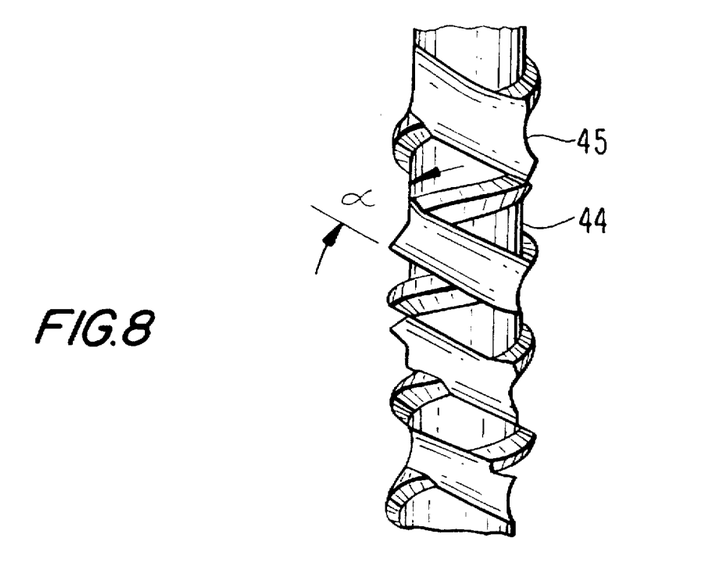
FIG. 8 is an elevational view of a middle portion of a drill/screw modified from the middle portion shown in FIG. 7.

Grooves may be provided at a broad range of angles. FIG. 7 shows a portion of a screw with the helical groove 43 rotating in the reverse direction to the screw threads 42 at a shallow angle $\beta$. FIG. 8 shows a portion of a screw 44 with the helical groove 45 rotating in the reverse direction to the screw threads at a steep angle $\alpha$.

Figure 9:
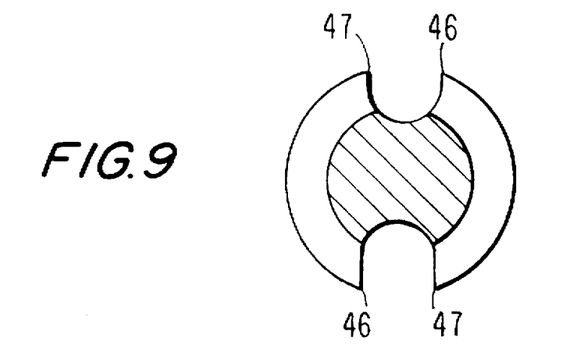
FIGS. 9–12 are cross-sectional views of typical drill/screws in accordance with the invention.
Figure 12:
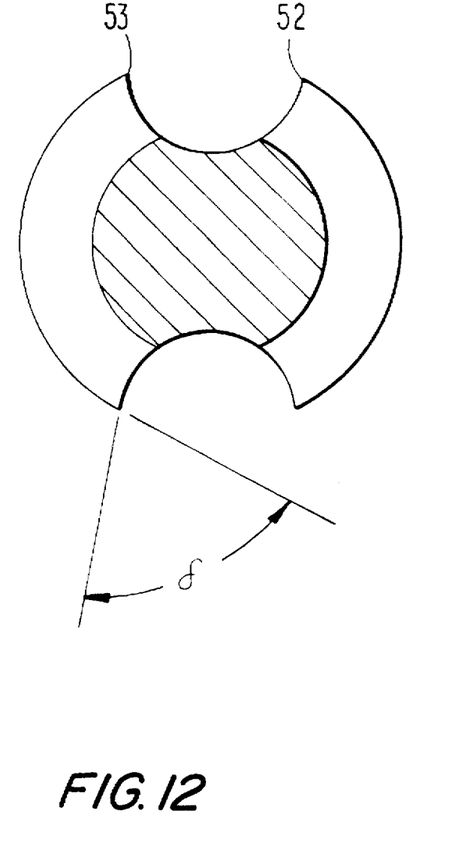

FIG. 9 shows a cross section through a typical clearance hole drilling screw in accordance with the invention. The threads are formed such that the screw will screw into material when rotated clockwise. The leading edges of the thread 47 and the trailing edges of the thread 46 form a right angle with the flute. Rapid rotation of the screw 32 in the reverse direction to the screwing action causes the trailing edge of the thread 46 to cut into the wood and remove material. Reversing the direction of rotation of the screw 32 causes the screw to screw down into the material. The sharp edge 47 on the leading edge of the thread now enables the screw to act as a tap, thus enabling the screw 32 to tap threads into harder materials such as metal and some plastics. To further faciliate the tapping action, the cutting angle $\delta$ at the leading 53 and trailing 52 edges of the screw threads may be less than 90° to approximate the cutting angle of a conventional tap. See FIG. 12.

Figure 10:
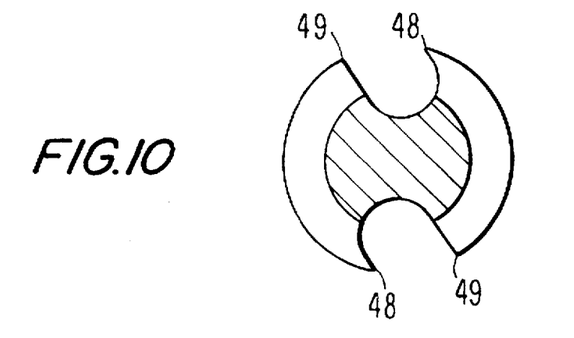

FIG. 10. shows a cross section through a preferred embodiment of the clearance hole drilling screw, where the trailing edge of the thread 48 is at an acute angle enhancing the cutting action of the thread when the screw is rotated in the reverse direction to the screwing action. The leading edge of the thread 49, is at an obtuse angle eliminating the possibility of damage that could be caused by the thread as the screw forms a thread in the material it is screwing into.

Figure 11:
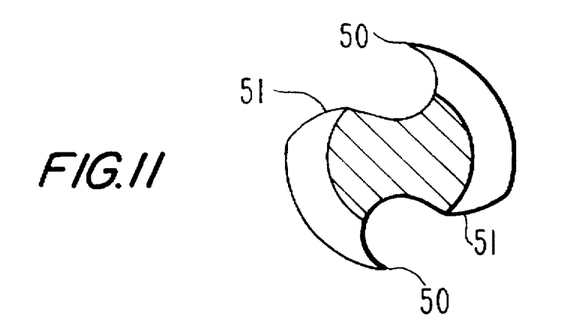

FIG. 11. shows a cross section through a version of another preferred clearance hole drilling screw, where the trailing edge of the thread 50 is at an acute angle enhancing the cutting action of the thread when the screw it rotated in the reverse direction to the screwing action. The leading edge of the thread 51 is rounded to enhance the free passage of the screw as it pushes aside material and forms threads in the material it is screwing into.

A preferred composition of the screw is metal or hardened metal. However, it is within the scope of this invention that other materials may be used.

It will be recognized by those skilled in the art that the product and process of the invention have wide application in the production of a diversity in the application of the clearance hole drilling screws determined by the design and specification of the screw.

Numerous modification are possible in the light of the above disclosure. For example, any conventional screw thread, screw head and drill tip may be used in the invention.

Therefore, it is to be understood that although preferred embodiments of the invention have been described, numerous modifications and variations are of course possible within the principles of the invention. All such embodiments, modifications and variations are considered to be within the spirit and scope of the invention as defined in the claims appended hereto.

We claim:

1. A combination screw and drill bit, which comprises a shaft extending axially from a screw head to a distal end, a forward helical screw thread extending around the periphery of said shaft, and a reverse helical drill flute recessed in said shaft at a location proximate to said distal end and rotating in a direction opposite the forward direction of said screw thread.

2. A combination screw and drill bit according to claim 1, further comprising a drill tip located at said distal end.

3. A combination screw and drill bit according to claim 2, wherein said flute extends from said drill tip through at least a portion of said screw thread, such that said flute intersects said screw thread and forms a groove across said screw thread.

4. A combination screw and drill bit according to claim 2, wherein said drill tip has a diameter less than or equal to the root diameter of said screw thread.

5. A combination screw and drill bit according to claim 1, wherein said screw thread extends from said distal end to approximately said screw head.

6. A combination screw and drill, bit according to claim 1, wherein said flute extends from said distal end through at least a portion of said screw thread, such that said drill flute intersects said screw thread and forms a groove across said screw thread.

7. A combination screw and drill bit according to claim 6, wherein said groove forms a leading and trailing cutting edge across said screw thread.

8. A combination screw and drill bit according to claims, wherein said leading and trailing cutting edge each have a cutting angle perpendicular to said screw threads.

9. A combination screw and drill bit according to claim 7, wherein said leading and trailing cutting edge each have an acute cutting angle such that the screw and drill bit may be used as a tap.

10. A combination screw and drill bit according to claim 1, wherein said screw head has a lateral groove with a cutting edge disposed on a lower surface thereof.

11. A combination screw and drill bit according to claim 1, wherein said screw head has a helical groove with a cutting edge disposed on a lower surface thereof.

12. A combination screw and drill bit, which comprises a shaft extending axially from a screw head to a distal end, a forward helical screw thread extending around the periphery of said shaft, and a drill flute recessed in said shaft and extending from said distal end through at least a portion of said screw thread, such that said drill flute intersects said screw thread and forms a groove across said screw thread having a leading and trailing cutting edge, said leading edge having a rounded edge and said trailing edge having a cutting angle of less than 90°.

13. A combination screw and drill bit according to claim 12, wherein said flute is helical and rotates in a reverse direction opposite the forward direction of said screw thread.

14. A combination screw and drill bit according to claim 12, wherein said flute extends in an axial direction parallel to said shaft.

15. A combination screw and drill bit according to claim 12 further comprising a drill tip located at said distal end.

16. A combination screw and drill bit according to claim 15 wherein said drill tip has a diameter less than or equal to the root diameter of said screw thread.

17. A combination screw and drill bit according to claim 12, wherein said screw thread extends from said distal end to approximately said screw head.

18. A combination screw and drill bit according to claim 12, wherein said screw head has a lateral or helical groove with a cutting edge disposed on a lower surface thereof.

19. A combination screw and drill bit, which comprises a shaft extending axially from a screw head to a distal end, a forward helical screw thread extending around the periphery of said shaft, and a drill flute recessed in said shaft and extending from said distal end through at least a portion of said screw thread, such that said drill flute intersects said screw thread and forms a groove across said screw thread having a leading and trailing cutting edge, said trailing edge having a rounded edge and said leading edge having an acute cutting angle.

20. A combination screw and drill bit according to claim 19, wherein said flute is helical and rotates in a reverse direction opposite the forward direction of said screw thread.

21. A combination screw and drill bit according to claim 19, wherein said flute extends in an axial direction parallel to said shaft.

22. A combination screw and drill bit according to claim 19, further comprising a drill tip located at said distal end.

23. A combination screw and drill bit according to claim 22, wherein said drill tip has a diameter less than or equal to the root diameter of said screw thread.

24. A combination screw and drill bit according to claim 19, wherein said screw thread extends from said distal end to approximately said screw head.

25. A combination screw and drill bit according to claim 19, wherein said screw head has a lateral or helical groove with a cutting edge disposed on a lower surface thereof.

26. A combination screw and drill bit, which comprises a shaft extending axially from a screw head to a distal end, a forward helical screw thread extending around the periphery of said shaft, and a drill flute recessed in said shaft and extending from said distal end through at least a portion of said screw thread, such that said drill flute intersects said screw thread and forms a groove across said screw thread having leading and trailing cutting edges contoured to provide a cutting action when the screw and drill bit is rotated in a reverse direction opposite the forward direction of said screw thread.

27. A combination screw and drill bit according to claim 26, wherein said flute is helical and rotates in a reverse direction opposite the forward direction of said screw thread.

28. A combination screw and drill bit according to claim 26, wherein said flute extends in an axial direction parallel to said shaft.

29. A combination screw and drill bit according to claim 26, further comprising a drill tip located at said distal end.

30. A combination screw and drill bit according to claim 26, wherein said leading and trailing cutting edge each have a cutting angle perpendicular to said screw threads.

31. A combination screw and drill bit according to claim 26, wherein said leading edge is rounded and said trailing edge has an acute angle.

32. A combination screw and drill bit according to claim 26, wherein said trailing edge is rounded and said leading edge has an acute angle.

33. A combination screw and drill bit according to claim 26, wherein said leading and trailing cutting edge each have an acute cutting angle such that the screw and drill bit may be used as a tap.

* * * * *